(12) United States Patent
Ganssle

(10) Patent No.: US 12,484,479 B2
(45) Date of Patent: Dec. 2, 2025

(54) ARTIFICIAL INTELLIGENCE LOSS MONITORING FOR COMBINE HARVESTERS

(71) Applicant: Craig Ganssle, Cumming, GA (US)

(72) Inventor: Craig Ganssle, Cumming, GA (US)

(73) Assignee: Craig Ganssle, Cumming, GA (US)

( * ) Notice: Subject to any disclaimer, the term of this patent is extended or adjusted under 35 U.S.C. 154(b) by 433 days.

(21) Appl. No.: 17/973,499

(22) Filed: Oct. 25, 2022

(65) Prior Publication Data

US 2024/0130280 A1 Apr. 25, 2024
US 2024/0224856 A9 Jul. 11, 2024

(51) Int. Cl.
| | |
|---|---|
| *A01D 41/127* | (2006.01) |
| *G06T 7/00* | (2017.01) |
| *G06T 7/70* | (2017.01) |
| *G06V 20/10* | (2022.01) |
| *G06V 20/56* | (2022.01) |
| *G06V 20/64* | (2022.01) |

(52) U.S. Cl.
CPC ........ *A01D 41/1273* (2013.01); *G06T 7/0012* (2013.01); *G06T 7/70* (2017.01); *G06V 20/188* (2022.01); *G06V 20/56* (2022.01); *G06V 20/64* (2022.01); *G06T 2207/30188* (2013.01); *G06T 2207/30242* (2013.01); *G06T 2207/30252* (2013.01)

(58) Field of Classification Search
CPC .............. A01D 41/1273; G06V 20/188; G06T 2207/30188; G06T 2207/30242
See application file for complete search history.

(56) References Cited

U.S. PATENT DOCUMENTS

| | | | |
|---|---|---|---|
| 10,255,670 B1 * | 4/2019 | Wu .................... | H04N 7/183 |
| 2016/0084987 A1 * | 3/2016 | Dybro .................. | G01V 99/00 702/5 |
| 2018/0210444 A1 * | 7/2018 | Sakaguchi ............ | G01S 15/86 |
| 2019/0384321 A1 * | 12/2019 | Nishi .................... | B62D 49/06 |
| 2023/0316116 A1 * | 10/2023 | Elkin .................... | G06N 3/0442 |

OTHER PUBLICATIONS

U.S. Appl. No. 63/362,326; filed Mar. 31, 2022. (Year: 2022).*

* cited by examiner

*Primary Examiner* — Calvin Cheung
(74) *Attorney, Agent, or Firm* — Thomas Horstemeyer, LLP

(57) ABSTRACT

Disclosed are various embodiments for using artificial intelligence to monitor harvest losses of combine harvesters. Images can be periodically captured from a ground-facing camera mounted to a combine harvester. An amount of gleanings can be counted in the image. An estimated amount of harvest loss is then calculated based at least in part on the amount of gleanings. The estimated amount of the harvest loss can then be displayed to a user or can be used as the basis for automatically adjusting the operation of the combine harvester.

17 Claims, 7 Drawing Sheets

ARTIFICIAL INTELLIGENCE LOSS MONITORING FOR COMBINE HARVESTERS

BACKGROUND

Crops are often harvested in agriculture using combine harvesters and other machinery, which greatly increase agricultural productivity and efficiency of farms. However, combine harvesters often fail to completely harvest a crop. For example, some grains, seeds, or other gleanings may not be harvested because they were not collected by the header of the combine harvester. As another example, some grains, seeds, or other gleanings may make it through the combine harvester unprocessed and be left behind the combine harvester as it traverses a field. Different operating speeds of the combine harvester and different topologies of fields or within the same field can impact the efficiency of harvesting.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for using computer vision and artificial intelligence to reduce harvest losses when harvesting a crop with a combine harvester. One or more cameras can be mounted at various points on a combine harvester and pointed towards the ground in order to capture images of the ground. The unharvested portions of a crop, such as unharvested seeds, grains, etc. (also referred to as gleanings), can be identified in the captured images and counted. An estimate as to how much of the crop is unharvested can then be calculated based at least in part on the images, as well as where the harvest losses are occurring (e.g., at the header of the combine harvester, at the rear of the combine harvester indicating that seeds or grains are not being correctly harvested within the combine harvester, etc.). Appropriate corrective action can then be taken based on the estimated harvest losses (e.g., slowing the speed of the combine harvester, changing the reel speed of the header of the combine harvester, etc.).

Moreover, in some implementations, forward-facing cameras can be mounted or affixed to the combine harvester. The forward-facing cameras can be used to capture images of the ground or area in the direct path of the combine harvester. Object recognition can be performed on these objects to identify potential obstacles or other hazards in the path of the combine harvester. The operation of the combine harvester can be adjusted in response to obstacles detected in its path, such as halting the combine harvester until the object can be removed or steering the combine harvester around the obstacle in order to continue harvesting.

Additionally, the computer vision and machine-learning techniques used in the various embodiments of the present disclosure can be hosted and performed locally using computer hardware installed on the combine harvester. As a result, no internet connection to off site computing resources, such as cloud computing resources, is required. This allows for the various embodiments of the present disclosure to be operated in rural areas where there is limited or no Internet or other network connectivity.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1A:
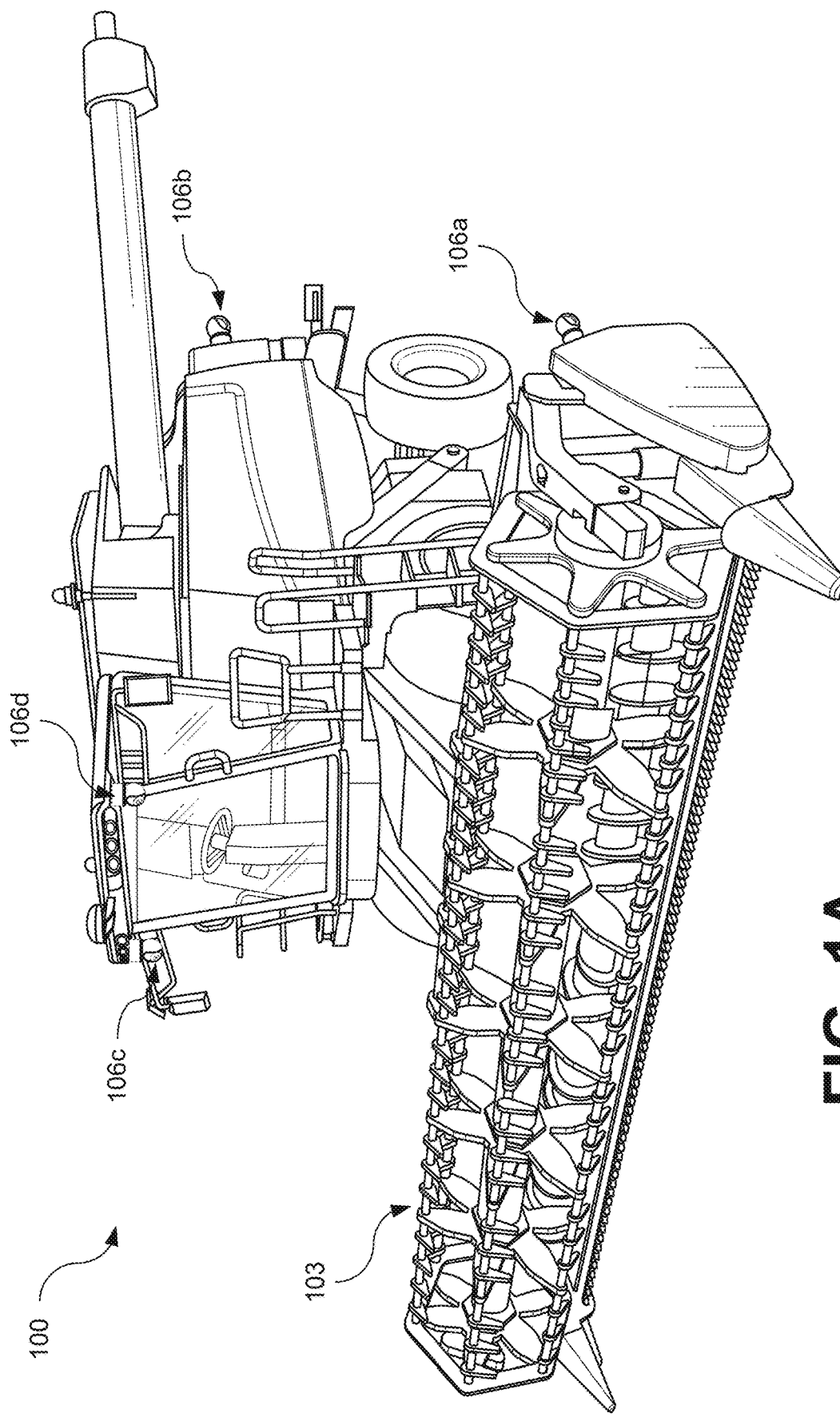
FIG. 1A is a drawing depicting front perspective of one of several embodiments of the present disclosure.

FIG. 1A depicts an example of a combine harvester 100 according to various embodiments of the present disclosure. The combine harvest can have a number of components, such as the header 103 which can be used to cut crops. The header 103 can include a reel that causes the cut crop to fall into an auger once it is cut, so that the cut crop can be moved inside the combine harvester 100 for further processing. Cameras 106, such as camera 106a, can be attached to the left and right sides of the header 103 and positioned so that the ground on the left and right sides of the header 103 is viewable by the cameras 106. One or more additional cameras 106, such as camera 106b, can be mounted to a rear section of the combine harvester 100 and also positioned so that the ground behind the combine harvest 100 is viewable by the camera 106b.

The cameras 106 can be attached or affixed to the combine harvester 100 using a variety of appropriate mechanisms. For example, in some implementations, one or more of the cameras 106 could be magnetically affixed to the combine harvester 100. In other implementations, fasteners such as screws, bolts, tape, adhesives, etc. could be used to attach the cameras 106 to the combine harvester 100.

In some implementations, additional, forward-facing cameras 106 could be mounted to the top of the header 103 or to other portions of the combine harvester 100, such as the cab of the combine harvester. These additional, forward-facing cameras 106 could be oriented so that ground of the path in front of the harvester is viewable by the additional, forward-facing cameras 106. Examples of forward-facing cameras 106 include cameras 106c and 106d.

Figure 1B:
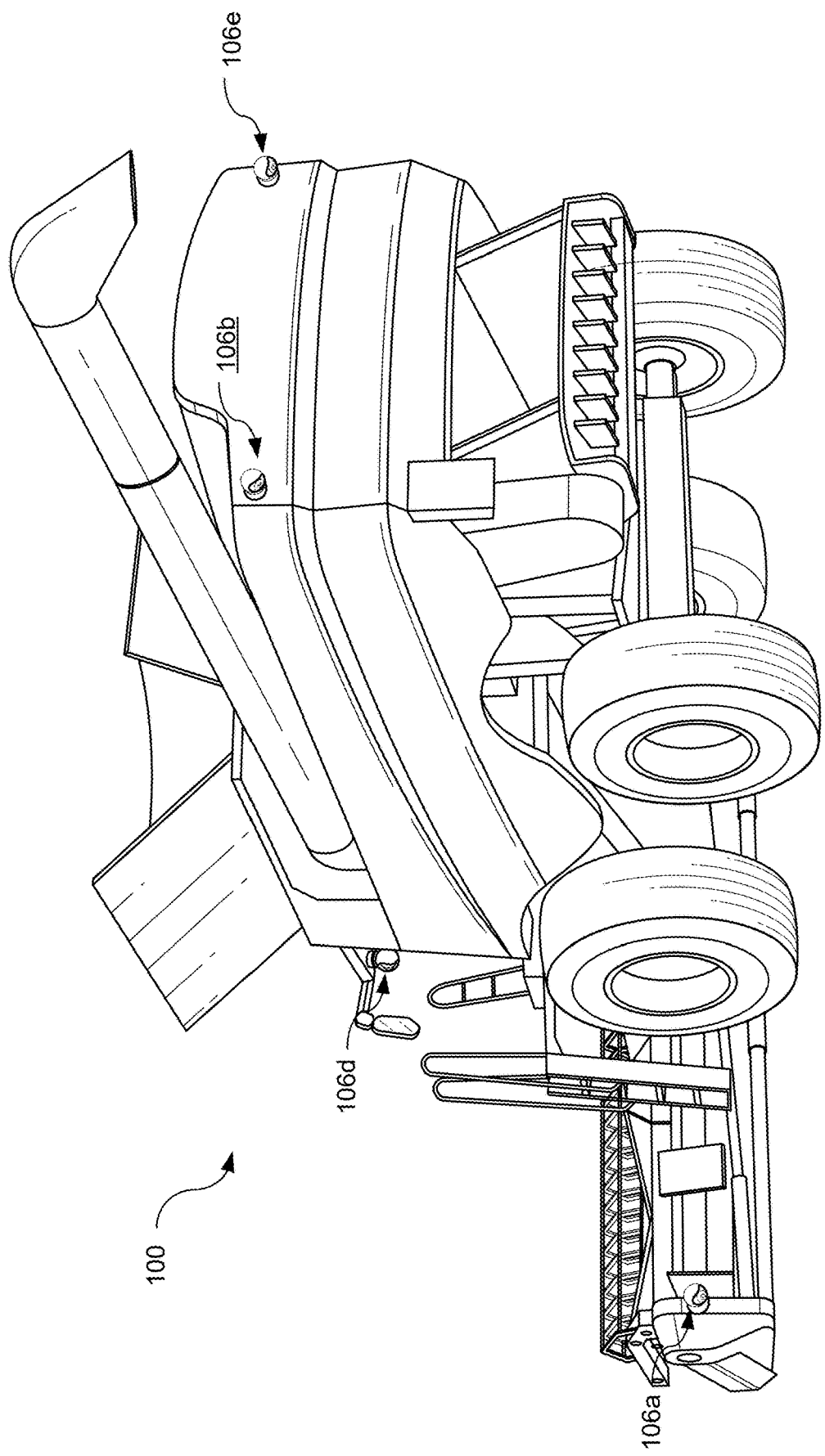
FIG. 1B is a drawing depicting rear perspective of one of several embodiments of the present disclosure.

FIG. 1B depicts a rear-perspective of the combine harvester 100 according to the various embodiments of the present disclosure. As shown, one or more cameras 106, such as camera 106a, can be attached to the header 103 of the combine harvester 100. Likewise, one or more cameras, such as cameras 106b and 106e, can be attached to the rear of the combine harvester 100. Moreover, forward-facing cameras 106, such as camera 106d, can be attached to various portions of the combine harvester 100.

Figure 2:
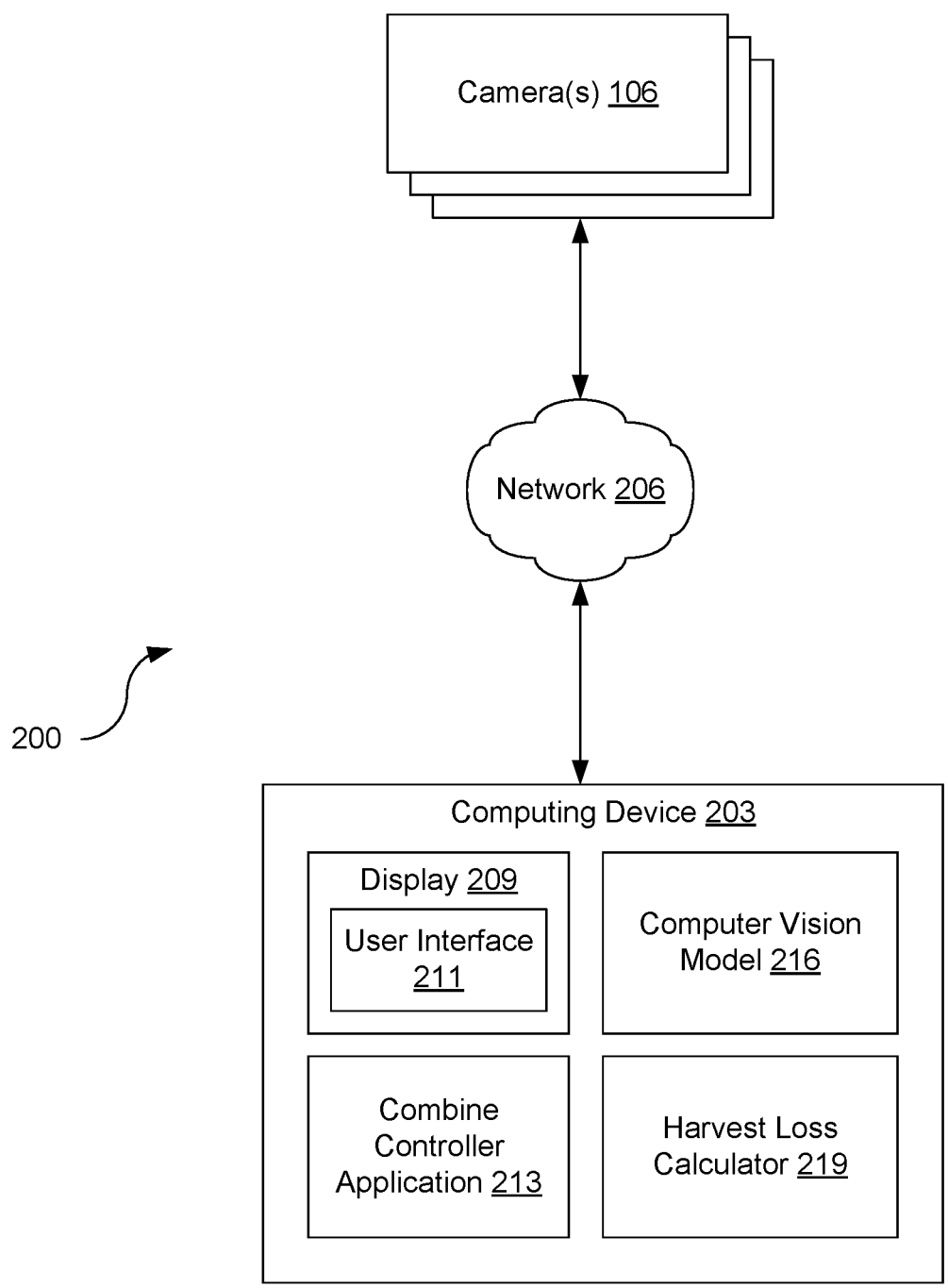
FIG. 2 is a drawing of a local area network according to various embodiments of the present disclosure.

With reference to FIG. 2, shown is a local area network 200 according to various embodiments. The local area network 200 can include the cameras 106 (e.g., cameras 106a, 106b, and 106c, as well as additional, front-facing cameras 106) and a computing device 203. In some implementations, the cameras 106 and the computing device 203 can be in data communication with each other via a network 206. In other implementations, the cameras 106 and the computing device 203 can be directly connected to each other via networking cables or using a wireless communications protocol that allows for direct or peer-to-peer communications.

The network 206 can include wired or wireless components or a combination thereof. Wired networks can include Ethernet networks, cable networks, or fiber optic networks. Wireless networks can include Institute of Electrical and Electronic Engineers (IEEE) 802.11 wireless networks (i.e., WI-FI®), BLUETOOTH® networks, etc. The network 206 can also include a combination of two or more networks 206.

The computing device 203 represents any type of computing device installed on the combine harvester 100 and in data communication with the cameras 106. The computing device 203 can include any computer system with a processor, a memory or other storage, which can be used to execute the various applications described herein. Examples of computing devices 203 include personal computers (e.g., a desktop computer, a laptop computer, or similar device), a mobile computing device (e.g., personal digital assistants, cellular telephones, smartphones, web pads, tablet computer systems, and similar devices), or other devices with like capability. In some implementations, computing devices 203 could also include dedicated, embedded, or application specific computing devices rather than general purpose computers.

The computing device 203 can include one or more displays 209, such as liquid crystal displays (LCDs), gas plasma-based flat panel displays, organic light emitting diode (OLED) displays, electrophoretic ink ("E-ink") displays, projectors, or other types of display devices. In some instances, the display 209 can be a component of the computing device 203 or can be connected to the computing device 203 through a wired or wireless connection. Different applications executed by the computing device 203 can cause the computing device 203 to render a user interface 211 on the display 209 of the computing device 203.

The computing device 203 can be configured to execute various applications, such as the combine controller application 213, the computer vision model 216, and/or the harvest loss calculator 219. However, other applications or services can also be executed by the computing device 203 in various embodiments of the present disclosure.

The combine controller application 213 can be executed to adjust the operation of the combine harvester 100 in various embodiments of the present disclosure based at least in part on data provided by the computer vision model 216 and/or the harvest loss calculator 219. The combine controller application 213, for example, may be implemented in those embodiments where the combine harvester 100 is computer controlled, driverless, or otherwise partially or fully automated in its operation.

The computer vision model 216 can be executed to analyze images captured by the cameras 106 to support the operation of the combine controller application 213 and/or the harvest loss calculator 219. For example, the computer vision model 216 could be executed to analyze images provided by one or more cameras 106 to identify unharvested, useful remnants or portions of the crop being harvested that have been leftover after harvesting (also known as gleanings), such as unharvested seeds, grains, grasses, etc. The computer vision model 216 could further count the number of unharvested portions of the crop (e.g., the number of unharvested seeds, grains, grasses, etc.) in the images, and provide that number to the harvest loss calculator 219. As another example, the computer vision model 216 could be executed to perform object detection or image recognition on images provided by one or more cameras 106 to identify potentially hazardous objects in the path of the combine harvester 100, and provide the results to the combine controller application 213 for further processing or action.

The harvest loss calculator 219 can be executed to determine the amount of crop being lost during the harvest of the crop based on image recognition performed by the computer vision model 216. The harvest loss calculator 219 for example, could calculate how much of the crop is being unharvested, the rate at which the crop is not being harvested, whether the harvest losses are being identified at a specific spot (e.g., at the header of the combine harvester 100 or the rear of the combine harvester 100), etc. The harvest loss calculator 219 could also cause this information to be presented within the user interface 211 rendered on the display 209 and/or supply this information to the combine controller application 213.

Figure 3A:
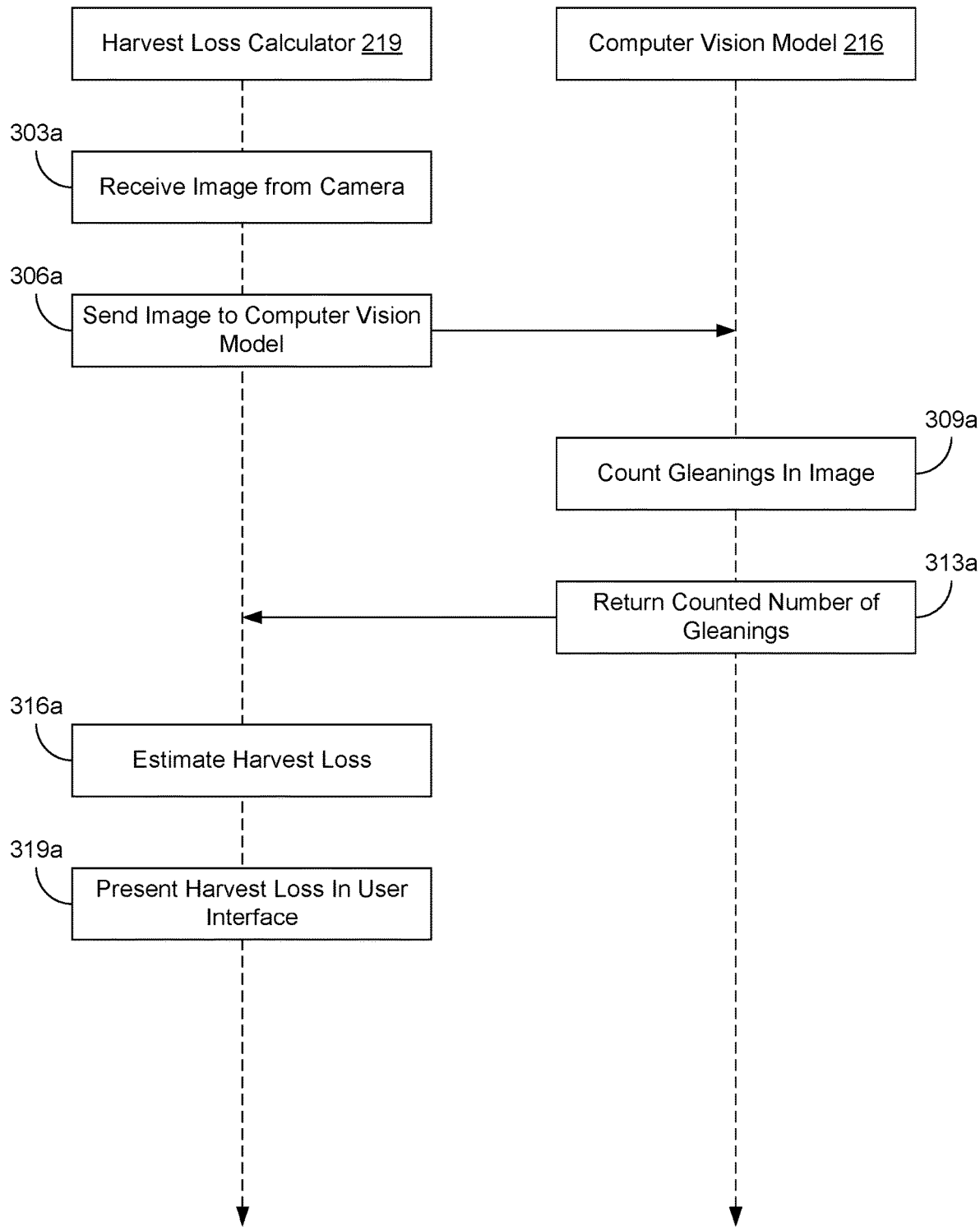
FIG. 3A is a sequence diagram one example of functionality implemented within the local area network of FIG. 2 according to various embodiments of the present disclosure.

Referring next to FIG. 3A, shown is a sequence diagram that provides one example of the interactions between the harvest loss calculator 219 and the computer vision model 216 according to various embodiments of the present disclosure. The flowchart of FIG. 3A provides merely an example of the many different types of functional arrangements that can be employed to implement the harvest loss calculator 219 and the computer vision model 216. As an alternative, the flowchart of FIG. 3A can be viewed as depicting an example of elements of a method implemented within the local area network 200.

Beginning with block 303a, the harvest loss calculator 219 can receive an image captured by a camera 106. The image can include metadata, such as the time that the image was captured, which camera 106 captured the image, a unique identifier of the image, etc. This metadata can be later used by the harvest loss calculator 219 to pinpoint where potential harvest losses are occurring.

Next, at block 306a, the harvest loss calculator 219 can send the image received from the camera 106 to the computer vision model 216. In some implementations, the harvest loss calculator 219 can also send additional information to the computer vision model 216, such as the identity or type of the crop being harvested, the unique image identifier, etc. In other implementations, the computer vision model 216 the identity or type of crop may have been previously specified or provided to the computer vision model 216. For example, prior to beginning the harvest, a crop specific computer vision model 216 may have been selected for use with the harvest loss calculator 219. In other implementations, the identity of the crop may not need to be specified to the computer vision model 216 because the computer vision model 216 may be trained to distinguish between different types of crops.

Then, at block 309a, the computer vision model 216 can use computer vision techniques to identify each of the gleanings of the crop in the image. Once identified, the computer vision model 216 can then count the number of identified gleanings in the image.

The computer vision model 216 can then return the number of gleanings counted in the image to the harvest loss calculator 219 at block 313*a*. When returning the number of gleanings counted, the computer vision model 216 could also identify the image in which the gleanings were counted.

Continuing to block 316*a* the harvest loss calculator 219 can estimate the amount of the crop that has been lost during harvesting. Estimates could be calculated in a number of different ways. For example, the harvest loss calculator 219 could estimate the amount of the harvest lost at the point in time that the image was captured by the camera 106. As another example, the harvest loss calculator 219 could estimate the total amount of the harvest lost during the operation of the combine harvester 100 by adding the estimate of the amount of the harvest lost at the point time that the image was captured to a running total estimate based on previous images captured by the camera 106. Similarly, the harvest loss calculator 219 could calculate the rate at which harvest losses are occurring (e.g., in bushels per meter/kilometer/mile, bushels per second/minute/hour, etc.) by comparing multiple harvest loss calculations over a predefined distance or period of time to identify an average rate of loss.

In addition to calculations or estimations about the total amount of the crop lost during harvesting, the harvest loss calculator 219 could also calculate or otherwise estimate the amount of the crop being lost during harvesting at specific points of the combine harvester 100. For example, the harvest loss calculator 219 could use images obtained from cameras 106*a* or 106*b* to calculate or estimate the amount of the crop being lost or otherwise unharvested on the left side or right side of the header 103, or being lost or otherwise unharvested by the header 103. As another example, the harvest loss calculator 219 could use images obtained from the camera 106*c* located at the rear of the combine harvester 100 to determine how much of the crop was unharvested after processing within the combine harvester 100.

Subsequently, at block 319*a*, the harvest loss calculator 219 can create a user interface 211 that includes one or more of the estimated harvest losses calculated at block 316*a*. The harvest loss calculator 219 can then cause the user interface 211 to be rendered on the display 209 of the computing device 203 for use by the operator of the combine harvester 100.

Figure 3B:
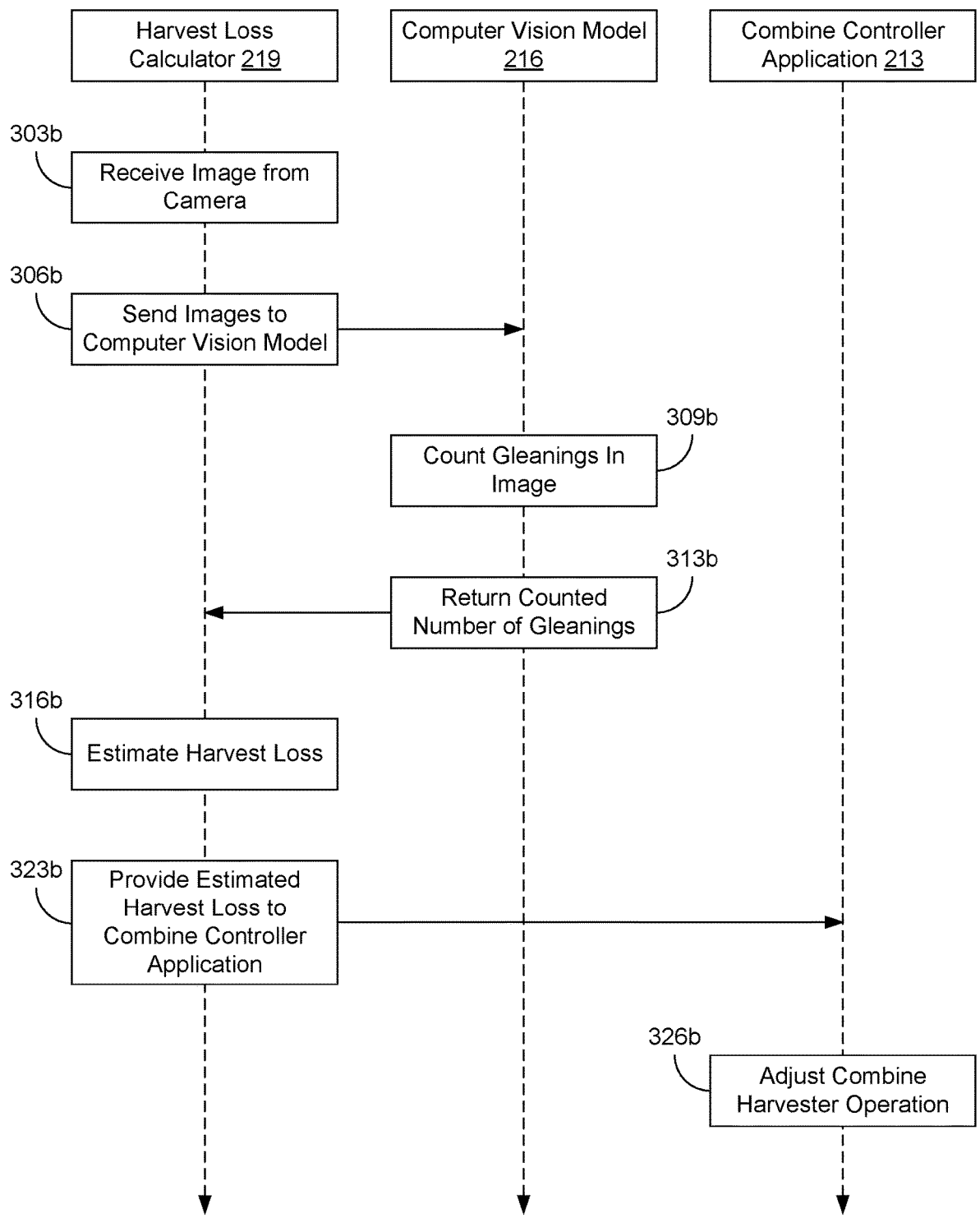
FIG. 3B is a sequence diagram one example of functionality implemented within the local area network of FIG. 2 according to various embodiments of the present disclosure.

Referring next to FIG. 3B, shown is a sequence diagram that provides one example of the interactions between the harvest loss calculator 219, the computer vision model 216, and the combine controller application 213 according to various embodiments of the present disclosure. The flowchart of FIG. 3B provides merely an example of the many different types of functional arrangements that can be employed to implement the harvest loss calculator 219, the computer vision model 216, and the combine controller application 213. As an alternative, the flowchart of FIG. 3B can be viewed as depicting an example of elements of a method implemented within the local area network 200.

Beginning with block 303*b*, the harvest loss calculator 219 can receive an image captured by a camera 106. The image can include metadata, such as the time that the image was captured, which camera 106 captured the image, a unique identifier of the image, etc. This metadata can be later used by the harvest loss calculator 219 to pinpoint where potential harvest losses are occurring.

Next, at block 306*b*, the harvest loss calculator 219 can send the image received from the camera 106 to the computer vision model 216. In some implementations, the harvest loss calculator 219 can also send additional information to the computer vision model 216, such as the identity or type of the crop being harvested, the unique image identifier, etc. In other implementations, the computer vision model 216 the identity or type of crop may have been previously specified or provided to the computer vision model 216. For example, prior to beginning the harvest, a crop specific computer vision model 216 may have been selected for use with the harvest loss calculator 219. In other implementations, the identity of the crop may not need to be specified to the computer vision model 216 because the computer vision model 216 may be trained to distinguish between different types of crops.

Then, at block 309*b*, the computer vision model 216 can use computer vision techniques to identify each of the gleanings of the crop in the image. Once identified, the computer vision model 216 can then count the number of identified gleanings in the image.

The computer vision model 216 can then return the number of gleanings counted in the image to the harvest loss calculator 219 at block 313*b*. When returning the number of gleanings counted, the computer vision model 216 could also identify the image in which the gleanings were counted.

Continuing to block 316*b* the harvest loss calculator 219 can estimate the amount of the crop that has been lost during harvesting. Estimates could be calculated in a number of different ways. For example, the harvest loss calculator 219 could estimate the amount of the harvest lost at the point in time that the image was captured by the camera 106. As another example, the harvest loss calculator 219 could estimate the total amount of the harvest lost during the operation of the combine harvester 100 by adding the estimate of the amount of the harvest lost at the point time that the image was captured to a running total estimate based on previous images captured by the camera 106. Similarly, the harvest loss calculator 219 could calculate the rate at which harvest losses are occurring (e.g., in bushels per meter/kilometer/mile, bushels per second/minute/hour, etc.) by comparing multiple harvest loss calculations over a predefined distance or period of time to identify an average rate of loss.

In addition to calculations or estimations about the total amount of the crop lost during harvesting, the harvest loss calculator 219 could also calculate or otherwise estimate the amount of the crop being lost during harvesting at specific points of the combine harvester 100. For example, the harvest loss calculator 219 could use images obtained from cameras 106*a* or 106*b* to calculate or estimate the amount of the crop being lost or otherwise unharvested on the left side or right side of the header 103, or being lost or otherwise unharvested by the header 103. As another example, the harvest loss calculator 219 could use images obtained from the camera 106*c* located at the rear of the combine harvester 100 to determine how much of the crop was unharvested after processing within the combine harvester 100.

Subsequently, at block 323*b*, the harvest loss calculator 219 can provide the estimated amount of the crop being lost during harvesting calculated at block 316*b* to the combine controller application 213.

Next, at block 326*b*, the combine controller application 213 can adjust the operation of the combine harvester 100 based at least in part on the estimated amount of the crop being lost during harvesting calculated at block 316*b*. For example, the combine controller application 213 could compare the estimated amount of the crop being lost during harvesting to one or more predefined rules or thresholds. These predefined rules and thresholds could define various levels of acceptable harvest losses, as well as corrective actions that could be taken in response to harvest loss levels exceeding a predefined threshold. For example, if harvest loss levels exceeded a predefined amount, the combine controller application 213 could cause the combine harvester 100 to decrease speed in order to increase the amount of the crop being harvested. As another example, if harvest loss levels exceeded a predefined amount, the combine controller application 213 could cause the combine harvester 100 to decrease the roller speed of the header 103 in order to increase the amount of the crop collected by the header 103. Similarly, if harvest losses were detected as being higher on one side of the header 103 than the other, then the combine controller application 213 could cause the roller for the side of the header 103 with a higher amount of crop loss to decrease. Moreover, the predefined rules or thresholds could be location dependent. For example, if the combine harvester 100 were on a hill, different loss amounts might be acceptable compared to when the combine harvester 100 is operating on flat terrain, and different corrective actions might be appropriate (e.g., changing the reel speeds on the header 103, the speed of the combine harvester 100, etc.).

Figure 4A:
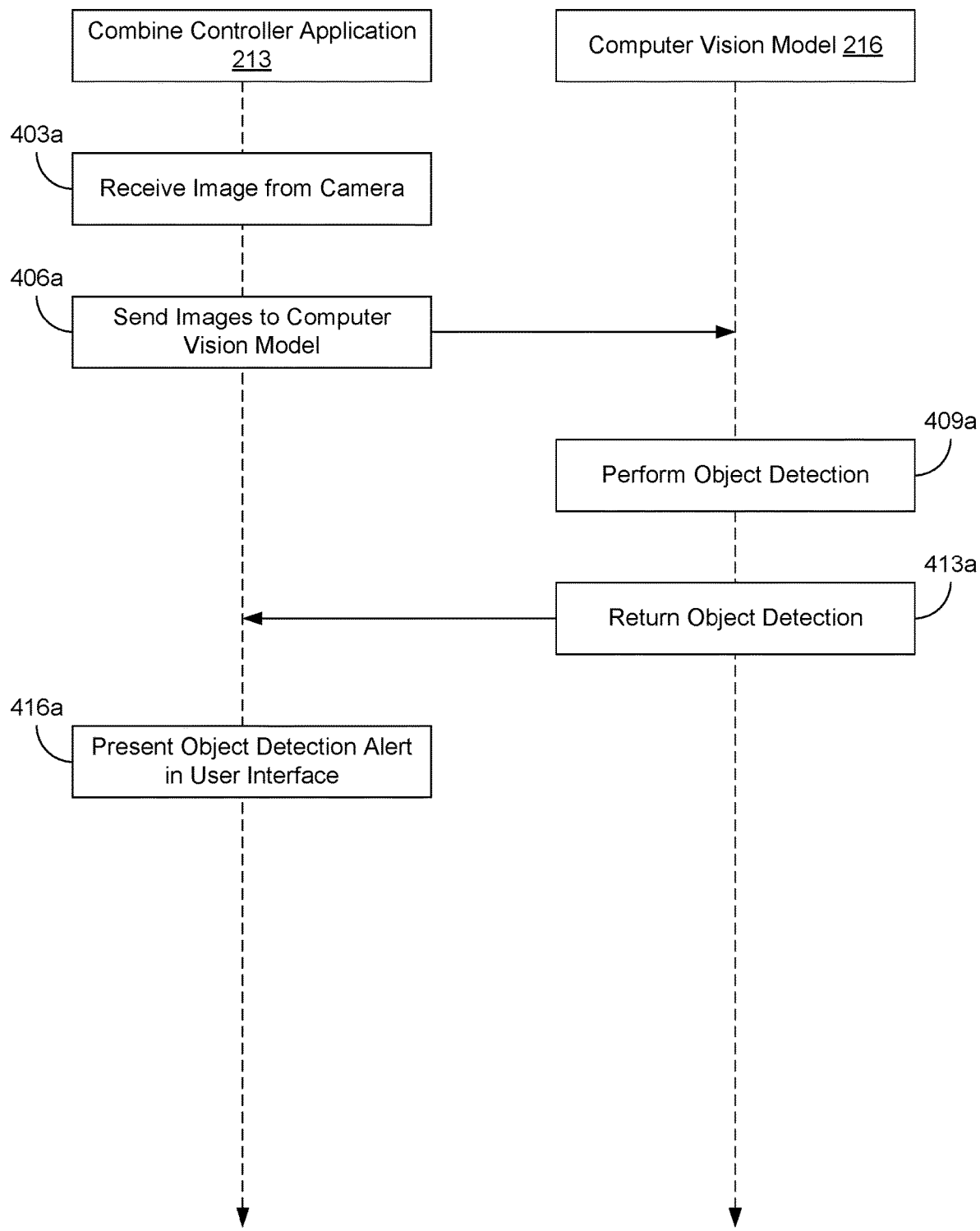
FIG. 4A is a sequence diagram one example of functionality implemented within the local area network of FIG. 2 according to various embodiments of the present disclosure.

Referring next to FIG. 4A, shown is a sequence diagram that provides one example of the interactions between the combine controller application 213 and the computer vision model 216. The sequence diagram of FIG. 4A provides merely an example of the many different types of functional arrangements that can be employed to implement the combine controller application 213, the computer vision model 216, etc. As an alternative, the sequence diagram of FIG. 4A can be viewed as depicting an example of elements of a method implemented within the local area network 200.

Beginning with block 403a, the combine controller application 213 can receive an image captured by a forward-facing camera 106. The image can include metadata, such as the time that the image was captured, which forward-facing camera 106 captured the image, a unique identifier of the image, etc.

Then, at block 406a, the combine controller application 213 can send the image received from the forward-facing camera 106 to the computer vision model 216.

Next, at block 409a, the computer vision model 216 can perform object detection or object recognition analysis on the image received at block 406a to identify any objects in the image. Any appropriate object detection or object recognition technique could be used as appropriate.

If an object is detected as being present in the image, the computer vision model 216 can further attempt to identify the object using various machine learning techniques, which could attempt to identify the object based at least in part on how similar it is to other objects that have been detected and classified in the past (e.g., as part of an initial or ongoing training process). If the confidence score of a classification meets or exceeds a predefined threshold, then the computer vision model 216 could determine the identity of the object matches the identify of the classification. If multiple confidence scores for multiple classifications meet or exceed the threshold, or if no confidence score for a classification meets or exceeds the threshold, then the computer vision model 216 could consider the object to be undetected or unclassified.

Subsequently, at block 413a, the computer vision model 216 can return the results of the object detection or recognition technique(s) performed at block 409a to the combine controller application 213.

Moving on to block 416a, can present an object detection alert within the user interface 211 on the display 209 of the computing device 203. The object detection alert could include the identity of the object that was returned by the computer vision model 216, the image that the object was detected in, the confidence score for the identification, and potentially other data. The object detection alert could also include audio indicators that an object has been detected within an image captured by a forward-facing camera 106 and, therefore, is in the path of the combine harvester 100. As a result, the operator of the combine harvester 100 could take appropriate action to avoid a collision with the identified object, such as stopping the combine harvester 100 in order to remove or investigate the object, redirecting the combine harvester 100 around the object, or other appropriate measures.

Figure 4B:
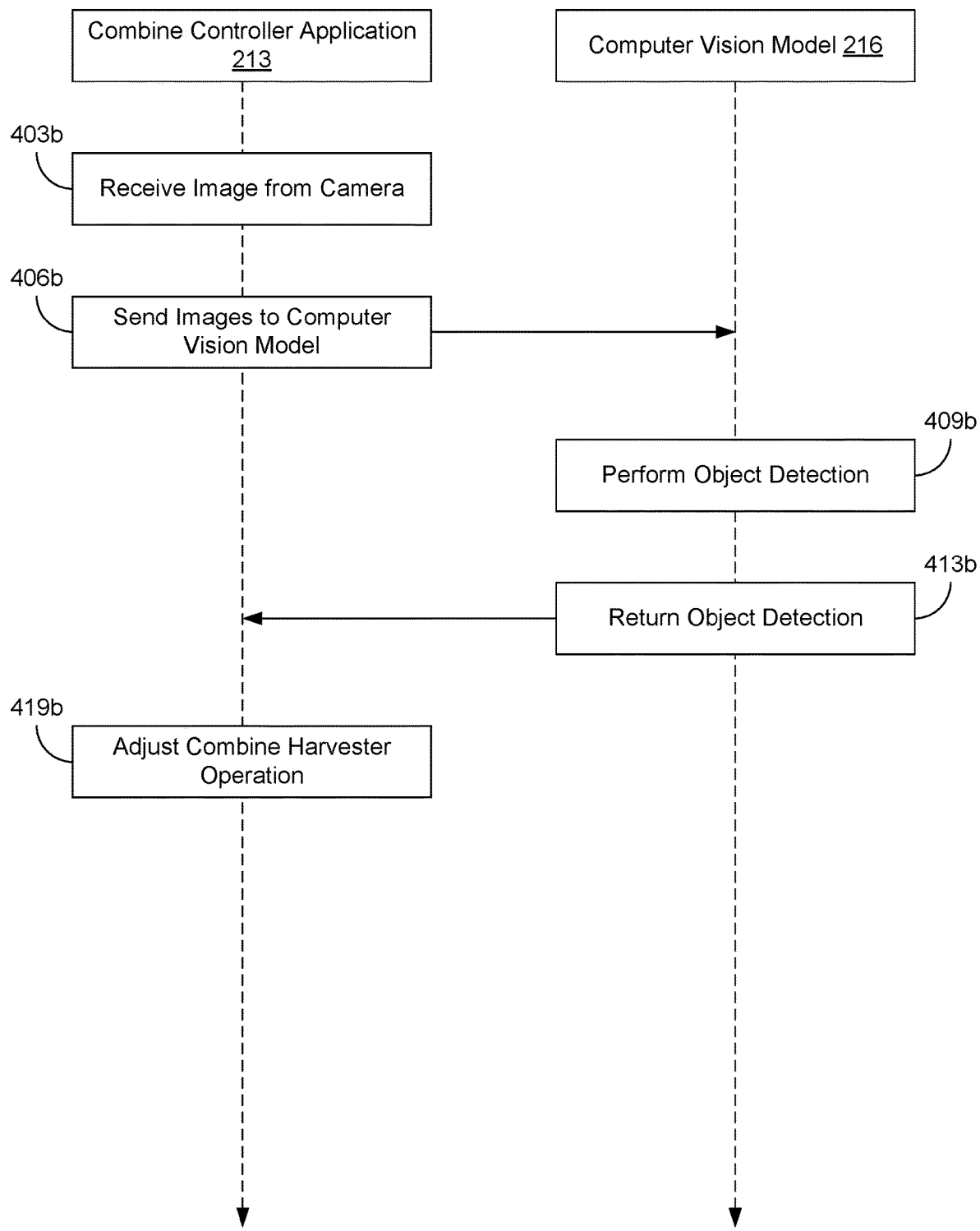
FIG. 4B is a sequence diagram one example of functionality implemented within the local area network of FIG. 2 according to various embodiments of the present disclosure.

Referring next to FIG. 4B, shown is a sequence diagram that provides one example of the interactions between the combine controller application 213 and the computer vision model 216. The sequence diagram of FIG. 4B provides merely an example of the many different types of functional arrangements that can be employed to implement the combine controller application 213, the computer vision model 216, etc. As an alternative, the sequence diagram of FIG. 4B can be viewed as depicting an example of elements of a method implemented within the local area network 200.

Beginning with block 403b, the combine controller application 213 can receive an image captured by a forward-facing camera 106. The image can include metadata, such as the time that the image was captured, which forward-facing camera 106 captured the image, a unique identifier of the image, etc.

Then, at block 406b, the combine controller application 213 can send the image received from the forward-facing camera 106 to the computer vision model 216.

Next, at block 409b, the computer vision model 216 can perform object detection or object recognition analysis on the image received at block 406a to identify any objects in the image. Any appropriate object detection or object recognition technique could be used as appropriate.

If an object is detected as being present in the image, the computer vision model 216 can further attempt to identify the object using various machine learning techniques, which could attempt to identify the object based at least in part on how similar it is to other objects that have been detected and classified in the past (e.g., as part of an initial or ongoing training process). If the confidence score of a classification meets or exceeds a predefined threshold, then the computer vision model 216 could determine the identity of the object matches the identify of the classification. If multiple confidence scores for multiple classifications meet or exceed the threshold, or if no confidence score for a classification meets or exceeds the threshold, then the computer vision model 216 could consider the object to be undetected or unclassified.

Subsequently, at block 413b, the computer vision model 216 can return the results of the object detection or recognition technique(s) performed at block 409a to the combine controller application 213.

Then, at block 419b, the combine controller application 213 could take appropriate corrective action based at least in part on the type of object identified by the computer vision model 216. For example, some objects may present little risk of harm or damage to the combine harvester 100 or the header 103. If the combine controller application 213 determines that the object identified by the computer vision model 216 presents little risk or danger to the combine harvester 100, then the combine controller application 213 could cause no corrective application to be taken. Other objects may present a risk or danger to the combine harvester 100 or the header 103, in which case the combine controller application 213 could cause the combine harvester 100 to redirect itself around the object or to halt operation until the object is removed and operation is resumed. Similarly, if the computer vision model 216 indicates that the object is unidentified, the combine controller application 213 could cause the combine harvester 100 to halt operation until the object is further investigated.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A combine harvester, comprising:
   a header;
   a first camera mounted to a left side of the header, the first camera facing the ground;
   a second camera mounted to a right side of the header, the second camera facing the ground;
   a third camera mounted to a rear portion of the combine harvester, the third camera facing the ground;
   a computing device comprising a processor and a memory, the computing device being in data communication with the first camera, the second camera, and the third camera; and
   machine-readable instructions stored in the memory that, when executed by the processor, cause the computing device to at least:
   periodically capture a first image from the first camera;
   periodically capture a second image from the second camera;
   periodically capture third image from the third camera; and
   estimate an amount of harvest loss based at least in part on the first image, the second image, and the third image.

2. The combine harvester of claim 1, wherein the machine-readable instructions that cause the computing device to estimate the amount of harvest loss further cause the computing device to at least:
   count a first amount of gleanings in the first image;
   count a second amount of gleanings in the second image;
   count a third amount of gleanings in the third image; and
   calculate an estimated amount of harvest loss based at least in part on the first amount of gleanings, the second amount of gleanings, and the third amount of gleanings.

3. The combine harvester of claim 1, further comprising a display visible from within a cab of the combine harvester and wherein the machine-readable instructions further cause the computing device to at least render the amount of harvest loss on the display.

4. The combine harvester of claim 1, wherein the machine-readable instructions further cause the computing device to at least adjust the operation of the combine harvester based at least in part on the amount of harvest loss.

5. The combine harvester of claim 1, further comprising a front-facing camera attached to the combine harvester, wherein the machine-readable instructions further cause the computing device to at least:
   receive an image from the front-facing camera; and
   perform object recognition on the image from the front-facing camera to identify an object in the image received from the front-facing camera.

6. The combine harvester of claim 5, further comprising a display visible within the cab of the combine harvester, wherein the machine-readable instructions further cause the computing device to at least render an alert on the display, wherein the alert identifies the object in the image received from the front-facing camera.

7. The combine harvester of claim 5, wherein the machine-readable instructions further cause the computing device to at least adjust the operation of the combine harvester based at least in part on the identification of the object in the image received from the front-facing camera.

8. A method, comprising:
   periodically capturing an image from a ground-facing camera mounted to a combine harvester;
   estimating an amount of harvest loss based at least in part on the image; and
   adjusting the operation of the combine harvester based at least in part on the amount of harvest loss.

9. The method of claim 8, wherein estimating the amount of harvest loss further comprises:
   counting an amount of gleanings in the image; and
   calculating an estimated amount of harvest loss based at least in part on the amount of gleanings.

10. The method of claim 8, further comprising rendering the amount of harvest loss on a display viewable within a cab of the combine harvester.

11. The method of claim 8, further comprising:
    receiving an image from a front-facing camera; and
    performing object recognition on the image from the front-facing camera to identify an object in the image received from the front-facing camera.

12. The method of claim 11, further comprising rendering an alert on a display viewable within a cab of the combine harvester, wherein the alert identifies the object in the image received from the front-facing camera.

13. The method of claim 11, further comprising further adjusting the operation of the combine harvester based at least in part on the identification of the object in the image received from the front-facing camera.

14. A non-transitory, computer-readable medium, comprising machine-readable instructions that, when executed by a processor of a computing device, cause the computing device to at least:
    periodically capture an image from a ground-facing camera mounted to a combine harvester;
    estimate an amount of harvest loss based at least in part on the image;
    receive an image from a front-facing camera;
    perform object recognition on the image from the front-facing camera to identify an object in the image received from the front-facing camera; and adjust the operation of the combine harvester based at least in part on the identification of the object in the image received from the front-facing camera.

15. The non-transitory, computer-readable medium of claim 14, wherein the machine-readable instructions that cause the computing device to estimate the amount of the harvest loss further cause the computing device to at least:
   count an amount of gleanings in the image; and
   calculate an estimated amount of harvest loss based at least in part on the amount of gleanings.

16. The non-transitory, computer-readable medium of claim 14, wherein the machine-readable instructions, when executed by the processor, further cause the computing device to at least render the amount of harvest loss on a display viewable within a cab of the combine harvester.

17. The non-transitory, computer-readable medium of claim 14, wherein the machine-readable instructions, when executed by the processor, further cause the computing device to at least further adjust the operation of the combine harvester based at least in part on the amount of harvest loss.

* * * * *